United States Patent
Mendes et al.

(10) Patent No.: US 11,378,409 B2
(45) Date of Patent: Jul. 5, 2022

(54) METHOD AND SYSTEM FOR PROVIDING IN ADVANCE INFORMATION ON DRIVING ACTIONS FOR IMPROVING THE GLOBAL EFFICIENCY OF A VEHICLE

(71) Applicant: Fuelsave Consultoria, S.A., Évora (PT)

(72) Inventors: Luis Goncalves Mendes, Charneca da Caparica (PT); Antonio Luis Mendes Caldeira Fradique, Lisbon (PT); Antonio Joao Ferreira Reis, Amadora (PT)

(73) Assignee: MEIGHT TECHNOLOGIES, S.A., Evora (PT)

( * ) Notice: Subject to any disclaimer, the term of this patent is extended or adjusted under 35 U.S.C. 154(b) by 254 days.

(21) Appl. No.: 16/722,097

(22) Filed: Dec. 20, 2019

(65) Prior Publication Data

US 2021/0190521 A1 Jun. 24, 2021

(51) Int. Cl.
*G01C 21/34* (2006.01)
*G06F 16/22* (2019.01)
(Continued)

(52) U.S. Cl.
CPC ..... *G01C 21/3469* (2013.01); *G01C 21/3629* (2013.01); *G01C 21/3691* (2013.01); *G06F 16/22* (2019.01); *G08G 1/096775* (2013.01)

(58) Field of Classification Search
CPC ............ G01C 21/3469; G01C 21/3629; G01C 21/3691; G06F 16/22; G08G 1/096775
See application file for complete search history.

(56) References Cited

U.S. PATENT DOCUMENTS 8,290,701 B2 * 10/2012 Mason ............... G06Q 10/0833
701/422
8,799,461 B2 * 8/2014 Herz ..................... G06Q 30/02
709/224

(Continued)

FOREIGN PATENT DOCUMENTS

EP 2258588 A1 12/2010

OTHER PUBLICATIONS

Jadro.,; The Use of an Onboard Diagnostic Device to Provide Feedback on Driving Behaviors Related to Fuel Economy, published in 2017 by Behavior and Social Issues, 26, 190-193.

*Primary Examiner* — Luis A Martinez Borrero
(74) *Attorney, Agent, or Firm* — Porzio Bromberg & Newman P.C.

(57) ABSTRACT

The present invention relates to a computer implemented method for providing in advance information on driving actions for improving the global efficiency of a vehicle. The method comprising the steps of receiving vehicle technical data (VTD) from a VTD processor at a processing device; generating local information at the processing device from the received VTD and processing device information generated by the processing device; creating remote information at a remote server from the processing device information, external data provider information coming from one or more external data providers and client logistic information; and presenting the remote information and optionally the local information to the driving agent in advance of the driving action using the processing device. A system for carrying out said method comprising at least one processing device connected to a remote server is also disclosed.

18 Claims, 7 Drawing Sheets

(51) Int. Cl.
*G01C 21/36* (2006.01)
*G08G 1/0967* (2006.01)

(56) References Cited

U.S. PATENT DOCUMENTS

| | | | |
|---|---|---|---|
| 9,135,759 B2 | 9/2015 | Baer et al. | |
| 9,175,971 B1* | 11/2015 | Aldereguia | G01C 21/3469 |
| 9,587,954 B2* | 3/2017 | Gusikhin | G06Q 10/06311 |
| 10,809,080 B2* | 10/2020 | Zhang | G06N 3/0454 |
| 2008/0021628 A1* | 1/2008 | Tryon | B60W 20/00 |
| | | | 701/99 |
| 2008/0154712 A1* | 6/2008 | Wellman | B66F 9/07581 |
| | | | 705/7.26 |
| 2011/0309926 A1* | 12/2011 | Eikelenberg | G01C 21/3469 |
| | | | 340/439 |
| 2011/0313647 A1* | 12/2011 | Koebler | B60W 50/0097 |
| | | | 701/123 |
| 2013/0046526 A1* | 2/2013 | Yucel | G01C 21/3469 |
| | | | 703/8 |
| 2013/0059607 A1* | 3/2013 | Herz | G01C 21/3617 |
| | | | 455/456.3 |
| 2013/0060469 A1* | 3/2013 | Chen | G01C 21/3469 |
| | | | 701/527 |
| 2015/0019132 A1* | 1/2015 | Gusikhin | G06Q 10/047 |
| | | | 701/400 |
| 2016/0171521 A1* | 6/2016 | Ramirez | G07C 5/008 |
| | | | 701/409 |
| 2016/0311423 A1* | 10/2016 | Storm | B60L 7/08 |
| 2017/0309092 A1* | 10/2017 | Rosenbaum | G01M 17/007 |
| 2018/0037117 A1* | 2/2018 | Koebler | G08G 1/00 |
| 2018/0082495 A1* | 3/2018 | Koebler | B60W 10/10 |
| 2019/0283585 A1* | 9/2019 | Koebler | G08G 1/096775 |
| 2019/0283587 A1* | 9/2019 | Koebler | G01C 21/3617 |
| 2019/0283588 A1* | 9/2019 | Koebler | B60T 7/22 |
| 2019/0283589 A1* | 9/2019 | Koebler | G08G 1/0112 |
| 2019/0283591 A1* | 9/2019 | Koebler | B60W 10/08 |
| 2019/0283592 A1* | 9/2019 | Koebler | B60L 15/2045 |
| 2019/0283593 A1* | 9/2019 | Koebler | B60L 58/12 |
| 2019/0283598 A1* | 9/2019 | Koebler | F16D 61/00 |
| 2019/0283601 A1* | 9/2019 | Koebler | B60W 10/184 |
| 2019/0322174 A1* | 10/2019 | Koebler | B60L 8/003 |
| 2019/0325376 A1* | 10/2019 | Khasis | G08G 1/0112 |
| 2021/0216929 A1* | 7/2021 | Lassoued | G01C 21/3605 |
| 2022/0092893 A1* | 3/2022 | Rosenbaum | G07C 5/008 |

* cited by examiner

METHOD AND SYSTEM FOR PROVIDING IN ADVANCE INFORMATION ON DRIVING ACTIONS FOR IMPROVING THE GLOBAL EFFICIENCY OF A VEHICLE

BACKGROUND OF THE INVENTION

Field of the Invention

The present invention relates generally to a computer implemented method for providing in advance information on driving actions for improving the global efficiency of a vehicle. A system for carrying out said method is also disclosed.

Description of Related Art

Processes and systems are known in the art which provide information to the driver of a vehicle in order to obtain fuel savings in the course of the path to be performed by the vehicle.

Such systems are based on the real-time collection of relevant data from the vehicle/driver, such data being processed by a processing unit (for example, a mobile device with dedicated application or an integrated processing unit in the vehicle) in the road's respective context of the path and then generated driving optimization information that is sent to the driver in real time (for example, through the same mobile device or from a display integrated in the vehicle). Therefore, it has been possible to obtain fuel savings and thereby improve the energy efficiency of the vehicle.

The document entitled "The Use of an Onboard Diagnostic Device to Provide Feedback on Driving Behaviors Related to Fuel Economy", of Brian V. Jadro, published in 2017 by Behavior and Social Issues, 26, 190-193, relates to a device (Scangauge-e™) which collects information provided by vehicle's sensors and processes the same through the vehicle's electronic control unit. The device then provides real-time feedback aimed at increasing fuel economy by using a behavior modification plan while driving. The information provided to the driver by the present solution does not take into account the driver's profile or any information from external data providers concerning, for example, the journey, traffic, meteorology, or client logistics information. Also, this solution does not optimize the information collected in order to provide information to the driver in advance, nor does resort to a database in which cumulative information is stored based on improving the accuracy of the information provided to the driver over time.

European patent EP 2258588, entitled "Device For Monitoring Vehicle Driving"; filed on 2009, by Crambo, S. A. e Garcia Manchado, Nilo, discloses a device for monitoring the driving process of a vehicle, which interacts with the driver in real time, in order to achieve optimal use of fuel in the vehicle from the ecological and economic point of view. The device uses information on driving mode, atmospheric conditions, traffic, type of road, among others and, based on these variables, provides real-time feedback in order to improve driving efficiency. The present device does not use information coming from the vehicle's CAN/FMS line. By discarding the information resulting from said CAN line, one is ignoring the most reliable source of information of the vehicle, that is to say, the one that results directly from its sensors, which information is decisive to accurately ascertain the vehicle's performance. The present solution uses only the sensors of the mobile device and does not resort to a server and database in order to optimize information and provide information to the driver in advance, whereby, with this solution, the amount of information is relatively small and locally processed, yielding inaccurate performance estimates and which do not take into account historical data concerning, for example, the driver and vehicle.

The publication entitled "Cognitive Mechanisms of Behavior Change in the Case of In-Vehicle Fuel Economy Feedback", of Institute of Transportation Studies—University of California, relates to a study concerning the drivers behavioral changes and the adoption of ecological driving behaviors when in the presence of feedback concerning fuel economy. The existence of a feedback interface in the vehicle generates changes in the driving mode and, consequently, in the reduction of fuel consumption. However, this disclosure does not teach or provides clues about a driving optimization process and system based on information collected from various sources and stored in a database, nor about the provision of optimized information, in advance, to the driver.

The solution described in U.S. Pat. No. 9,135,759 B2, entitled "Driver Measurement and Incentive System for Improving Fuel-Efficiency", of LinkeDrive, Inc., relates to a method to assist a human driver making use of a display interface, a smartphone, tablet, PC, or any telematics or in-vehicle device installed in the vehicle. The display interface presents a real-time target for the human driver to follow to maximize fuel economy and safety, achieved by modulating the accelerator pedal appropriately. This solution does not collect client's logistic information, which would allow the client to know the urgency context or prices for fuel supply and that would allow the human driver to experience a more adequate driving to the condition where it is inserted. On the other hand, it does not perform an optimization that takes into account all of the data collected and a history of similar data, nor provides information in advance to the human driver based on such an optimization. This American patent discloses the use of a remote server, which, however, serves only to store information and send driving reports thereafter, without any immediate impact on the human driver. This solution also doesn't allow for a nun-human driving agent.

Accordingly, there is a need in the art for a method and system for providing in advance information on driving actions, either to a human or a machine driver, such that the global efficiency of a vehicle is improved, namely taking into account the history data related to driving contexts that can improve the reliability of the provided information to the driver over time.

SUMMARY OF THE INVENTION

The present invention relates to a computer implemented method for providing in advance information on driving actions to a driving agent of a vehicle, the method comprising the steps of:

receiving vehicle technical data (VTD) from a VTD processor at a processing device;

generating local information at the processing device from the received VTD and processing device information generated by the processing device;

creating remote information at a remote server from the processing device information, external data provider information coming from one or more external data providers and client logistic information; and presenting the remote information and optionally the local information to the driving agent in advance of the driving action using the processing device.

The VTD can be redirected at predefined time intervals to the processing device.

Preferably, the external data provider information includes one or more of data relating to altimetry of a path to be traveled, traffic data, route data or weather conditions.

The method of the invention further comprises a step of storing the processing device information, the external data provider information and the client logistic information in a database, wherein remote information is personalized to the driving agent through computing optimization of movement of the vehicle using one or more constraints generated from the processing device information, the external data provider information and the client logistic information and an optimization result is cross-checked with a current driving profile and the method further comprising the steps of correcting in received processing device information one or more vehicle model properties and one or more states; and upgrading a model of the vehicle with the corrected processing device information before computing optimization of movement of the vehicle.

Preferably, the method further comprising the step of identifying the current driving profile from one or more of the processing device information, the external data provider information and the client information stored in the database; and computing optimization of movement of the vehicle further comprises the steps of selecting a path to be traveled from one of the constraints of the external data provider information; selecting an altimetry of the path; and selecting a speed limit for locations of the path from one of the constraints of the external data provider information.

In particular, computing optimization of movement of the vehicle further comprises one or more of the steps of:

selecting path turns of a path to be traveled from one of the constraints of the external data provider information;

selecting longitudinal and lateral acceleration limits for safety purposes from one of the constraints of the external data provider information;

selecting longitudinal and lateral acceleration limits for performance purposes from one of the constraints of the external data provider information;

selecting a weather condition from one of the constraints of the external data provider information; and selecting a traffic condition from one of the constraints of the external data provider information.

Preferably, computing optimization of movement of the vehicle further comprises one or more of the steps of:

selecting a time of arrival at a destination from one of the constraints of the client information;

selecting a speed limit for transport of a special load from one of the constraints of the client information;

selecting longitudinal and latitudinal acceleration limits for transport of a special load from one of the constraints of the client information; and selecting a required place of passage from one of the constraints of the client information.

More preferably the method further comprises the steps of:

selecting one or more driving characteristics correlated with an overall efficiency from the current driver profile;

filtering information coming from the computing optimization of movement of the vehicle with the one or more selected driving characteristics to obtain the remote information; and selecting a mode of communication for presenting the remote information at the processing device, wherein the mode of communication is auditory and/or visual if the driving agent is a human driving agent or the mode of communication is programmatically if the driving agent is a machine driving agent.

The invention also relates to a non-transitory computer readable medium including software instructions which when executed by a processor performs a method comprising:

receiving vehicle technical data (VTD) from a VTD processor at a processing device;

generating local information at the processing device from the received VTD and processing device information generated by the processing device;

creating remote information at a remote server from the processing device information, external data provider information coming from one or more external data providers and client logistic information; and presenting the remote information and optionally the local information to a driving agent in advance of the driving action using the processing device.

Preferably the VTD from the VTD processor is received at the said processing device at predefined time intervals.

In an embodiment of the non-transitory computer readable medium, the method performed by its software instructions further comprises computing optimization of movement of the vehicle using one or more constraints generated from the information from the processing device information, the external data provider information and the client logistic information and an optimization result is cross-checked with a current driving profile. It further comprises correcting in received processing device information one or more vehicle model properties and one or more states; and upgrading a model of the vehicle with the corrected processing device information before computing optimization of movement of the vehicle and selecting a path to be traveled from one of the constraints of the external data provider information; selecting an altimetry of the path; and selecting a speed limit for locations of the path from one of the constraints of the external data provider information, wherein computing optimization of movement of the vehicle comprises:

selecting path turns of a path to be traveled from one of the constraints of the external data provider information;

selecting longitudinal and lateral acceleration limits for safety purposes from one of the constraints of the external data provider information;

selecting longitudinal and lateral acceleration limits for performance purposes from one of the constraints of the external data provider information;

selecting a weather condition from one of the constraints of the external data provider information; and selecting a traffic condition from one of the constraints of the external data provider information.

Preferably, computing optimization of movement of the vehicle further comprises: selecting a time of arrival at a destination from one of the constraints of the client information;

selecting a speed limit for transport of a special load from one of the constraints of the client information;

selecting longitudinal and latitudinal acceleration limits for transport of a special load from one of the constraints of the client information; and selecting a required place of passage from one of the constraints of the client information.

In an embodiment, computing optimization of movement of the vehicle further comprises:

identifying the current driving profile from one or more of the processing device information, the external data provider information and the client information stored in a database;

selecting one or more driving characteristics correlated with an overall efficiency from the current driver profile;

filtering information coming from the computing optimization of movement of the vehicle with the one or more selected driving characteristics to obtain the remote information; and selecting a mode of communication for presenting the remote information at the processing device, wherein the mode of communication is auditory and/or visual if the driving agent is a human driving agent or the mode of communication is programmatically if the driving agent is a machine driving agent.

The invention further discloses a system for providing in advance information on driving actions to a driving agent of a vehicle, the system comprising one or more processing devices for receiving vehicle technical data (VTD) from a VTD processor and generating local information at the processing device from the received VTD and processing device information generated by the one or more processing devices; and a remote server creating remote information from the processing device information, external data provider information coming from one or more external data providers and client logistic information, wherein the one or more processing devices present the remote information and optionally the local information to the driving agent in advance of the driving action.

In an embodiment, the system of the invention further comprises a redirection device for redirecting the VTD from a CAN to the one or more processing devices at predefined time intervals.

In a preferred embodiment, the system further comprises a database for storing the processing device information, the external data provider information and the client logistic information.

BRIEF DESCRIPTION OF THE DRAWINGS

In the following the invention will be described with reference to the accompanying drawings, wherein.

DETAILED DESCRIPTION OF THE INVENTION

Figure 1:
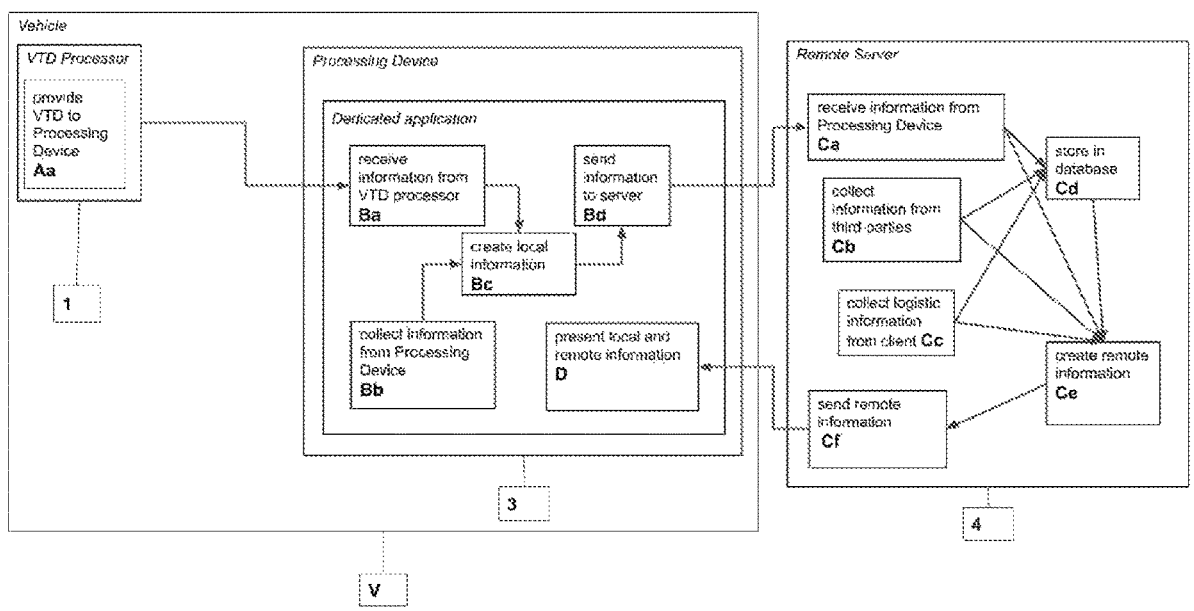
FIG. 1 is a flow diagram of a system and its related computer implemented method for improving the global efficiency of a vehicle in accordance with the teachings of the present invention. This diagram shows an exemplary system with the VTD processor inside a vehicle.

The present invention relates generally to a computer implement method for providing in advance information on driving actions in order to improve the global efficiency of a vehicle. A system is also disclosed for carrying out the inventive method.

In the present description, the term "information" relates to a set of data that may be received, stored, processed or provided by a processing unit such as, for example, a computer. In the present context, the terms "information" and "data" should be considered synonymous unless explicitly stated otherwise.

Within the context of the present invention, "real time" relates to the time interval required to perform a data/information transmission between a sender and a receiver. This time interval, although non-zero, corresponds to a fraction of time that is negligible, for instruction or alert purposes, of a driving agent. By way of example, processing information from a vehicle on a real-time server means that the information reaches the server and is processed with a negligible time delay from the time in which the information was generated on the vehicle. In another example, alerting or instructing a real-time driving agent means transmitting the information to the driving agent in such a short time interval that makes it possible for this agent to react to the alert or to comply with the instruction in a timely manner.

Within the context of the present invention, a vehicle is a sea, land or air transport means equipped with one or more sensors for collecting data signals from the vehicle. Those data signals constitute a so-called Vehicle Technical Data, hereinbelow designated by VTD. In operation, VTD generated from said vehicle sensors can then be processed by a VTD processor. Thus, the set of sensors from a vehicle is arranged in data connection with at least one VTD processor, such that the said VTD can be provided to the VTD processor.

VTD may be related to a plurality of technical data collectable from the vehicle, such as for example, instantaneous fuel rate, vehicle speed, vehicle weight, accelerator pedal position, brake pedal position. These are non-limitative examples of a possible and evolving range of collectable data from vehicles.

An example of a VTD processor is the CAN—the acronym of Control Area Network (technically equivalent to the Fleet Management System or FMS used in heavy duty vehicles); usually, the CAN is installed within the vehicle on the vehicle production line, so most of today's vehicles, not to say their entirety, are already equipped with these components. Said CAN/FMS allows communication between several sensors through a single protocol and a single line. It is quite usual to have two CAN/FMS, with different transmission speeds in the same vehicle.

However, it is not mandatory to have the VTD processor arranged inside the vehicle. In fact, it may be arranged outside the vehicle. An example of an off-vehicle VTD processor is a remote server used by the vehicle's manufacturer or an authorized third-party. In this case, the information (the VTD) provided from the set of vehicle sensors is made available to a VTD processor which then sends it to a processing device of the present invention.

For the sake of simplicity, the following invention is mainly described making reference to a vehicle CAN, although this should be construed as mere example embodiment for the VTD processor instead of a limitative design thereof.

Within the context of the present invention, the overall efficiency of a vehicle is understood to mean the amount of fuel (e. g., referred to in liters) used to carry a given amount of load (e. g., one ton) along a given path from point A to point B. Intrinsic factors to the vehicle (such as, e. g., the speed at which it travels, among others) and extrinsic to it (such as, e. g., wind speed or the geography of the path, among others) affect its overall efficiency.

By "driving agent" is meant a human being or a machine which takes control of a vehicle during a path between a point A and a point B. The driving agent takes the vehicle control decisions in accordance with predetermined rules.

By driving technique is meant the orientation, method and/or the sequence of actions on the actuators of a vehicle, which results in the movement of a vehicle from point A to point B. Within the scope of driving technique, it is considered also the reaction and actuation times in view of a certain problem, such as when, e. g., an obstacle is in the vehicle's collision course.

Control of a vehicle is achieved through a limited number of actuators which are part of the vehicle, which actuators can be driven by a driving agent with a particular driving technique to control the vehicle on a path from point A to point B. By way of example only, said actuators are divided between those continuously actuated, as is the case of the pedals (accelerator, brake, clutch, steering wheel), or discreetly actuated, as is the case of Retarders (only existing in heavy duty vehicles) or the ignition mechanism. There are other actuators, such as automatic gearboxes, where the driving technique used on the accelerator pedal greatly influences the gear shift and consequently the consumption of the vehicle. In the case of non-human driving agents, in a development over time perspective, in the first stage, analog actuators (intended for human drivers) will remain, but may also be automatically actuated. In a second stage, in a more or less distant future, it is foreseeable that all analog actuators are removed, the actuation being directly actuated via CAN.

The term "driving context" relates to two binomial interactions:
1. The first is a driving agent/vehicle interaction and relates to the driving technique used by a driving agent (human driver or machine) to drive a vehicle on a particular journey or path from a point A to a point B. The driving agent has its own driving technique, resulting from its training/programming that can be changed over time, for example, by way of a new learning/configuration. On the other hand, the vehicle also has its own characteristics, independent of the driving technique. Therefore, the same driving agent may produce different results when driving different vehicles. This is due to the different technical characteristics existing between vehicles of different models or different manufacturers.
2. The second is a vehicle/environment interaction, which takes into account the fact that the vehicle is inserted in a physical environment (e. g., path, road properties, traffic, weather conditions, path altimetry) and economic (e. g., delivery time, fuel price, load profitability).

Downsample is the act of reducing the frequency of a signal by creating a new signal with lower frequency and still representing the original signal. In this document the term is used as described in the art.

Interpolation is the act of mathematically estimating the value of a signal where it has not been acquired, starting from at least one point upstream and another downstream from the point where the new value is to be estimated.

The system for implementing the method of the invention is schematically illustrated in FIG. 1. The system comprises:
  at least one processing device (3) provided with a dedicated software application, which at least one processing device (3) is connected in data communication to a VTD processor (1); and
  a remote server (4) connected to the at least one said processing device (3), by way of bi-directional information communication.

Figure 2:
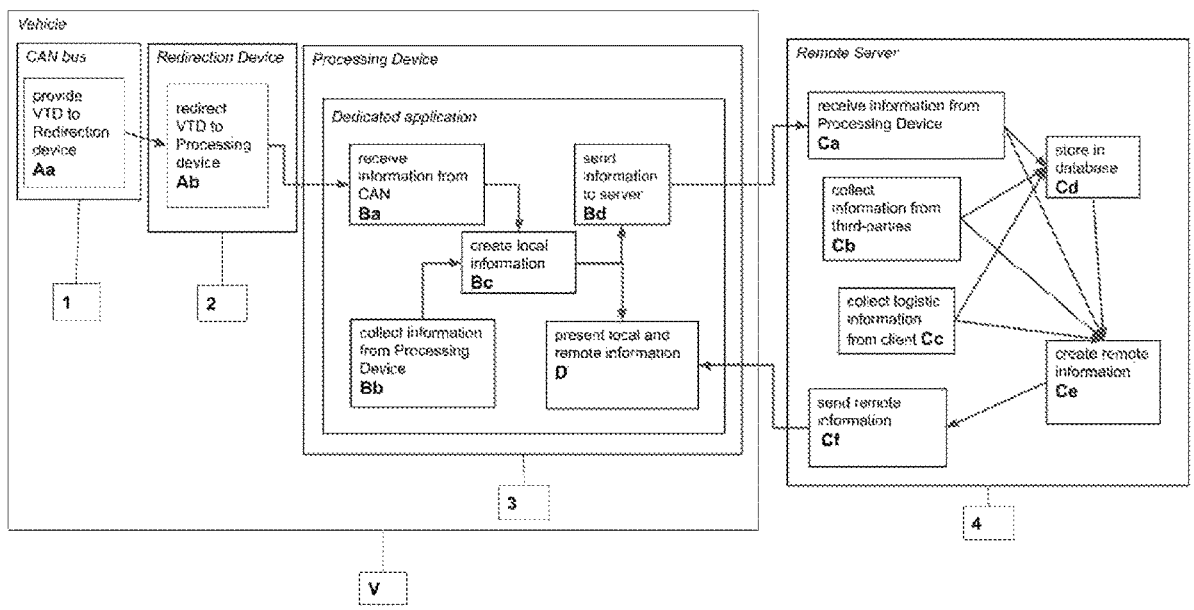
FIG. 2 is a preferred embodiment of the system and method of FIG. 1, wherein the VTD processor is a CAN and further comprising a redirection device (2) and a method step in which local information in addition to remote information is also presented to the driving agent.

While the VTD processor (1) is shown inside a vehicle, this is not mandatory and it may be arranged outside the same. An embodiment of the VTD processor (1) is the CAN bus schematically shown in FIG. 2.

In a preferred embodiment (see FIG. 2), the system comprises a redirection device (2). This redirecting device (2) is arranged between the vehicle CAN (1) and the processing device (3), so as to make the information provided by the CAN (1) available to the processing device (3).

More specifically, said redirection device (2) allows the information provided by the CAN (1) and the redirection of such information to said processing device (3) to be read through, namely, wireless transmission technology, such as for example Bluetooth, although any suitable transmission technology can be used for the same purpose. Since the CAN (1) transmits the most varied information coming from several sensors integrating the vehicle, in binary format and at different frequencies, the redirection device (2) translates this information, selects, from these sensors, the most relevant information relative to the overall efficiency of the vehicle and resends the respective data to the processing device (3) at a constant frequency, which is obtained by way of a downsample and interpolation.

In an embodiment, said processing device (3), in case the vehicle (V) is driven by a human driving agent, comprises means for presenting visual and auditory information, such as, e. g., a touch or non-touch screen and loudspeaker or speaker. In case the vehicle is driven by a non-human driving agent, the processing device (3) does not require the existence of said information display means, although the latter may exist. The processing device (3) of the invention may be a mobile device selected from the group comprising mobile phone, tablet, laptop computer and the like or a processing device integrated in the vehicle. The processing device (3) is capable of receiving and executing software applications developed by external software manufacturers and receiving information from the VTD processor (1) which in a preferred embodiment is the CAN. As already mentioned above, in an embodiment, the processing device (3) connects to a redirection device (2) in order to receive the information provided by the CAN (1). The processing device (3) is provided with a dedicated software application.

Said dedicated software application has two fundamental functions. The first function of the dedicated software application is to resend the information coming from VTD processor (1) to said remote server (4). The second function is to provide information to a vehicle driving agent (V) coming from the remote server (4) and information coming from the dedicated software application itself. Therefore, the dedicated software application acts as a process interface between the remote server (4) and the processing device (3).

The remote server (4) is, for example, a computer or a plurality of interconnected computers, accessible through the internet. This computer can be accessed through a mobile or wireless network, subject to authentication. The remote server can be made available in two ways:
- through a service contracted to a Cloud computing power provider, or
- by physically installing a computer in a particular location, for example, in an office, and connecting it to the Internet.

The first mode allows for more flexible use and availability, since it can increase or decrease the computational power instantaneously. The second mode has the advantage of being more advantageous from a long-term economic point of view.

A driving agent, as defined previously, will be the first receiver of the information generated by the process and system of the present invention.

Therefore, the information transmittable to the driving agent can take three formats in order to be correctly interpreted by the same:
1. auditory (in case of human driving agent), for example, by means of voice messages, among others;
2. visual (in case of human driving agent), for example, by means of text messages or graphics, among other means of visual representation;
3. programmatic (in case of machine driving agent), for example, by binary code.

The information transmittable to the driving agent is divided between the Alert category and the Instruction category. Within these two categories, the diversity of content to be generated on a remote server (4) is significantly greater than the diversity of content to be generated in the dedicated software application installed in the processing device (3) and this happens essentially for two reasons:
i The first reason is that a dedicated application has a reduced processing and memory limit due to the physical and technological constraint inherent to the processing device. On the contrary, a remote server, for example, housed in the cloud, does not suffer from any notable physical constraint, the possible technological constraints being negligible, precisely due to the inexistence of physical constraints. Therefore, multiple applications can be run on a remote server, such as functionalities can be added and removed continuously without loss of service. In view of the foregoing, the information coming from the remote server (4) is, in the present description, referred to as remote information. For example, the custom alert, sent to a particular driving agent, in which the vehicle is in excessive speed at entering a turn three hundred meters away or the custom instruction, sent to a certain driving agent from the remote server (4), to adjust the position of the accelerator, or brake, in the approach to the next ascent.
ii The second reason derives from the fact that a dedicated application is limited to the programming rules, as a result of the compilation of its unique source code, unlike a remote server, as described above. In this context, the information coming from the dedicated software application present in the processing device (3) is referred to herein as local information. An example of local information is an alert that the throttle position is at a low-efficiency position.

Thus, by using a remote server (4), the system of the invention has a computing power incomparably superior to any solution that works only by using a dedicated application installed in a processing device (3), which is the case of the prior art solutions. It is this system that, by generating remote information in addition to local information, enables a quite a significant increase of the overall efficiency of the vehicle, through an incomparable number of calculations that cover significantly more variables.

Still referring to FIG. 1, below it is described the process implemented by the system of the invention previously described.

A. A VTD processor (1) provides (Aa) VTD information to the processing device (3). In an embodiment, the VTD is redirected at predefined intervals to the processing device (3). In a preferred embodiment (FIG. 2), the VTD processor (1) is a CAN that is connected to a redirection device (2), which in turn redirects (Ab) the information provided by the CAN (1) to the processing device (3). The redirection action is performed at predefined time intervals, for example, every thousandth of a second, every hundredth of a second, every tenth of a second or every second, according to the technical specifications determined given the technical constraints of the system components. The redirection may be performed by any wireless transmission means known in the art, for example, by Bluetooth;

B. in turn, the processing device (3)
- receives (Ba) information from VTD processor (1),
- collects (Bb) information generated by the processing device (3) itself, for example, by means of sensors existing in the processing device (3) itself;
- generates (Bc) local information based on the information collected in previous steps (Ba) and (Bb). An example of step (Bc) is the production of local information from a check that the information collected in (Ba) is within predefined recommended ranges or not. Another example of local information is the data received and collected in (Ba) and (Bb) without any treatment;
- sends (Bd) the local information produced in (Bc) to a remote server (4), wherein:

C. the remote server (4):
- receives (Ca) the information coming from step (Bd) undertaken in the processing device (3);
- collects (Cb) information coming from external data providers. In this respect, it is preferred to obtain information relating to the altimetry of the path, and data relating, for example, to traffic, routes, weather conditions, etc., may also be collected. For example, by knowing the departure and arrival points, it is possible to request from external supplier's data relating to weather and traffic conditions along a given route between said departure and arrival points. This information contributes to optimize the fuel consumption, since different routes or speeds can be chosen for the movement of the vehicle;
- collects (Cc) information regarding the client's logistics, for example, arrival and departure points and timetables (among others, for example, the time of delivery of goods). This information plays a role in optimizing fuel consumption if, for example, a navigation speed is defined that conforms to said information regarding departure, arrival and timetables;
- stores (Cd) in a database all information received in steps (Ca), (Cb) and (Cc). The database is relevant to the overall efficiency of the vehicle because it allows, for example, to associate the performance of a driving agent with each path stretch thus identifying zones that justify a more detailed suggestion. The database, by grouping information temporarily and geographically, allows the establishment of driving patterns, which may not be known a priori, that are correlated with driving performance, thus enabling the creation of alerts to avoid patterns that negatively impact overall efficiency of the vehicle. Stored history also allows, for example, understanding the evolution of the driving agents.

generates (Ce) remote information. This remote information is personalized to the driving agent through an optimization of the vehicle's movement, whose optimization result is cross-checked with a driving profile, in which:

the vehicle movement optimization uses a mathematical model of the vehicle and constraints generated from (Ca-Cb-Cc). Such a mathematical model calculates the control of a vehicle in order to minimize a cost function, the fuel consumption, in this case. For example, considering the path to be performed and the current condition of the vehicle, at every moment, it calculates the throttle position that minimizes fuel consumption;

the driving profile is identified based on the information that is received (Ca) in the course of the current path, and on the stored information (Cd), which results from the previous path history. For example, knowing that a particular driving agent has poor braking performance in a particular path, remote information can be generated which contains only the braking related content;

sends (Cf) the remote information generated in (Ce) to the processing device (3); and D. the processing device (3):

displays (D) the remote information from step (Cf) and, optionally, the local information from step (Bc) to the driving agent. As mentioned previously, this information can be presented, for example, in visual and/or auditory form, if the driving agent is human and can be presented programmatically, if the driving agent is a machine.

The system of the invention transmits information in 3 different times. The direction of information transmission can be unidirectional or bi-directional; the transmission means may be wired or wireless; non-limiting examples of wireless technology are the Wifi or Mobile or Bluetooth, depending on the operating frequency. Thus, the transmission of information between the CAN (1) and the redirection device (2) is typically unidirectional, carried out by cable, although other suitable means may also be considered, for example, wireless transmission means; the transmission of information between the redirecting device (2) and the processing device (3) is typically bi-directional and wireless, for example, via Bluetooth; finally, the transmission of information between the processing device (3) and the remote server (4) is typically bi-directional and wireless/mobile. The characteristics of all such technologies are known in the art and the reason for the specific choice of these configurations relates to economic matters, because they all objectively assure the transmission of information at speeds well above those required (three kilobytes per second).

With respect to signal delays, the delay recorded, for example, at the transmission of information between the CAN (1) and the redirection device (2) is negligible, since in this transmission one deals with latencies of at least one order of magnitude lower than the sending latency, through a mobile network, to a remote server and later processing. Downsample and interpolation are carried out, for example, by the redirection device (2) and set the frequency of the transmission of information to the processing device (3); the delay in the transmission of information, for example, between the redirection device (2) and the processing device (3) is also negligible, since it is typically performed by Bluetooth and with a small amount of information compared to the capability of the Bluetooth protocol; the preferred configuration for the transmission between the processing device (3) and the remote server (4) ensures a roundtrip to the remote server below 200 milliseconds, even though this value is subject to the quality and coverage of the Mobile network and to the processing performed on a remote server. Thus, within the context defined in this invention, it is possible to be processing real-time vehicle information on a remote server and to be returning real time useful information to the driver agent via the processing device (3).

For a vehicle driven by a human driving agent, a practical example is the collection of information from the accelerator pedal position sensor, which is sent to a dedicated application installed on a tablet, and from there to a remote server. On the one hand, the dedicated application shows, in real time, in a graph of the efficiency gauge style, the value of the accelerator position, for example 90%, where the pointer is in the red zone, representing little efficiency. On the other hand, the server is constantly calculating various vehicle's control possibilities considering the current path and states of the vehicle in order to find the optimal position and thus creating an accelerator position profile that is sent to the dedicated application installed on the tablet and which will be shown, for example, on a map, suggesting to the driving agent which should the evolution of the accelerator position be along its path.

In case of the machine driving agent, a practical example is collecting information coming from the sensor relating to the current speed of the vehicle and sending thereof to a dedicated application installed in the processing device and from there to the remote server. Said server collects information from the path's altimetry, makes a mathematical optimization that results in a constant calculation of the speed profile along the path. Whenever a speed profile update is available, it is sent back to the dedicated application, which programmatically sends to the agent driving machine. The driving agent thus has an instruction to use different speed profiles.

Although there are prior art processes and systems, as mentioned in the background section, which aim to improve fuel consumption via information provided to the driving agent, none performs an optimization of the overall efficiency of the vehicle based on the driving context, as defined for the present invention. In fact, there are no prior art processes/systems which resort to i) an optimization process, based on the current states of the vehicle and other constraints; and ii) to a cross-checking of the information resulting from the optimization process with the identified driving profile, which is the result of a database that is being fed with different information, thus creating the most suitable remote information for those particular path, vehicle and driving agent.

Such an optimization, the result of which is cross-checked with a driving profile that is defined based on current information coming from various sources and collected at the time, and information from a journey's history previously performed, allows not only to optimize the overall efficiency of a vehicle in a particular path, as well as to perform such optimization taking into account the particular driving agent that is driving the vehicle in the chosen path. The impact of this effect is particularly surprising, since the process and system of the present invention allows optimum overall efficiencies or gradually convergent towards an optimum value regardless of the particular driving agent that is driving the vehicle.

To better understand the impact of the effect mentioned above, take as an example a distribution company having 20 vehicles and 40 human drivers. Naturally, by virtue of the personal traits of the drivers, each one has its own driving method and such variability generates in itself different results of overall efficiency for each vehicle. With the present invention, the creation of driving profiles, and their cross-checking with the optimization's result, allows to achieve optimum overall efficiency identical for each vehicle, regardless of the driver which drives it, this of course, if the drivers follow the instructions being provided by the process and system of the invention. Thus, the natural dissimilarities found among the 40 human drivers are eliminated which, without the support provided by the present invention, contribute to the generation of efficiency results very disparate from each other and far from optimum values obtainable by each one of drivers. Thus, each vehicle of the fleet of 20 will have its overall efficiency optimized regardless of the driver of said group of 40 driving it. It can be seen that the present invention yields a notable impact in terms of improving the company's economic results.

Said optimization process of the present invention allows to provide, in advance, to the driving agent, precise driving instructions and alerts during the path to be traveled, taking into account the driving context as defined above, thereby improving the vehicle's overall efficiency in that particular driving context and, most importantly, by allowing, by way of the increased information feed into the database, to provide incremental improvements in overall efficiency of the vehicle in future (different or identical) driving contexts. For example, under similar vehicle and environmental conditions, the driving agent is instructed to drive in a previously suggested manner. Such a technical effect has not hitherto been achieved in the art.

Next, the part of the process of the invention which is carried out on the server (4) is more specifically addressed. This specific part is identified in FIGS. 1 and 2 and is shown in more detail in FIG. 3, which precisely corresponds to the part relating to optimization and cross-checking with the driving profile.

Figure 3:
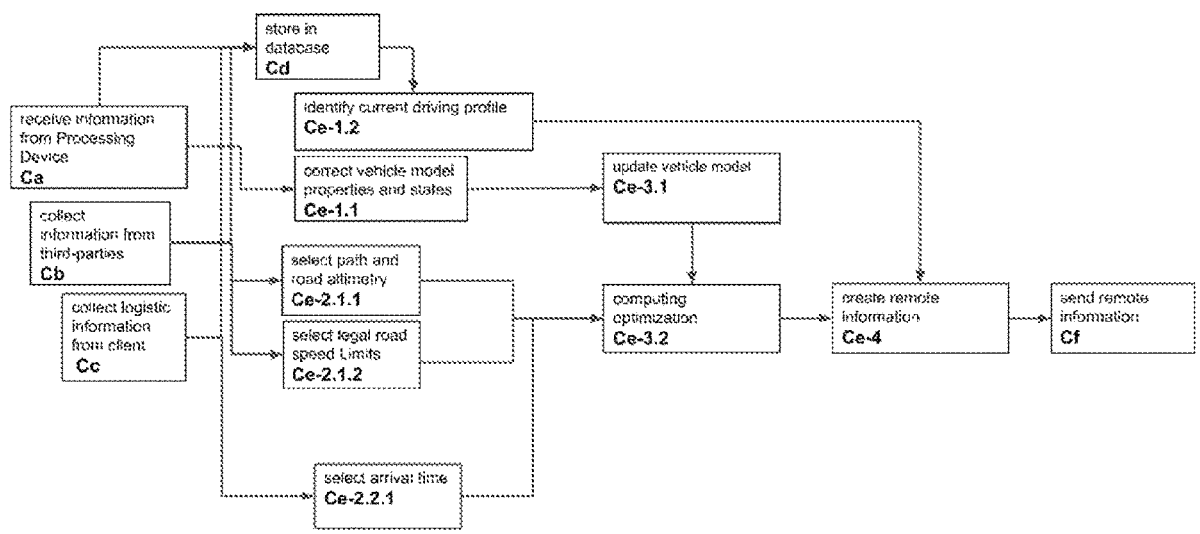
FIG. 3 is a flow diagram showing in more detail the method steps taking place in the remote server, namely a detail of step Ce of the method of FIGS. 1 and 2, which is specifically related with a data optimization to be sent to the driver, in the form of optimized driving instructions, in advance to the required driving action.
Figure 4:
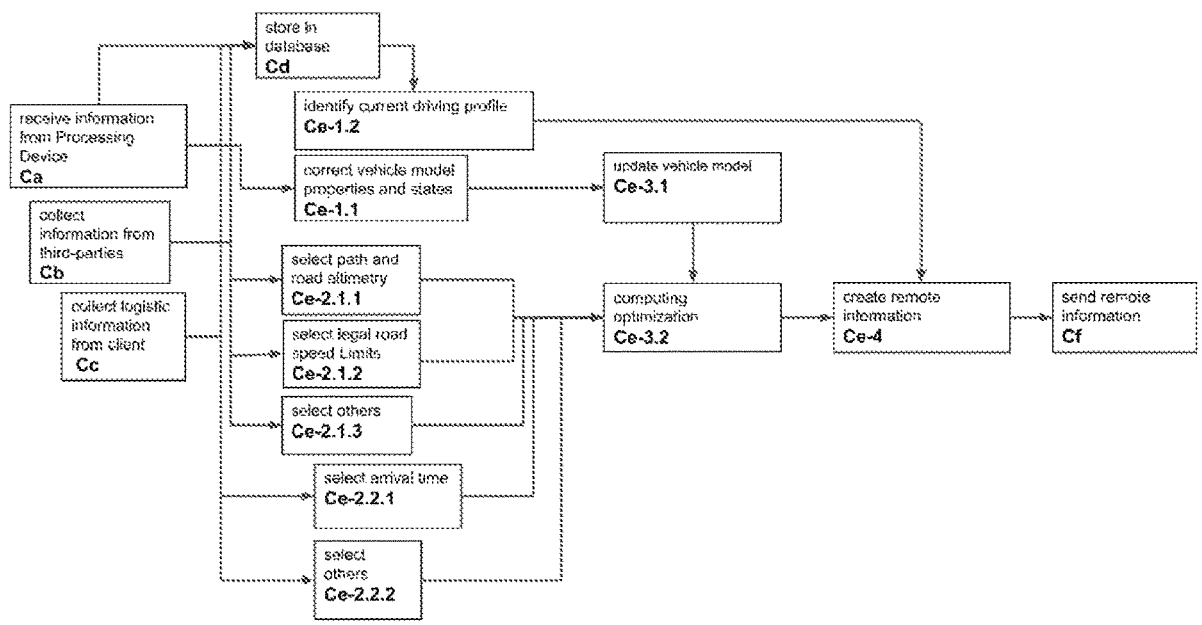
FIG. 4 depicts the method of FIG. 3 in which two optional steps of selecting others (Ce-2.1.3) and (Ce-2.2.2) are added.
Figure 5:
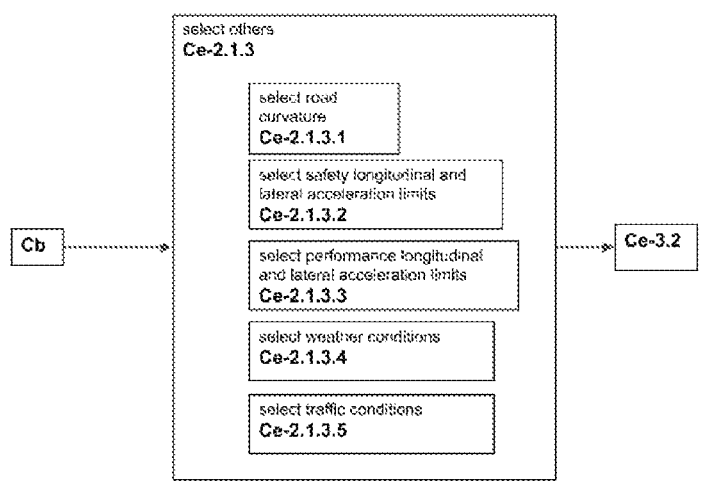
FIG. 5 is a detail of a preferred embodiment of step Ce-2.1.3 of FIG. 4.
Figure 6:
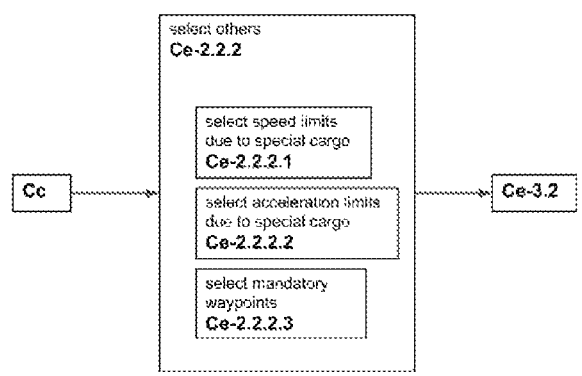
FIG. 6 is a detail of a preferred embodiment of step Ce-2.2.2 of FIG. 4.
Figure 7:
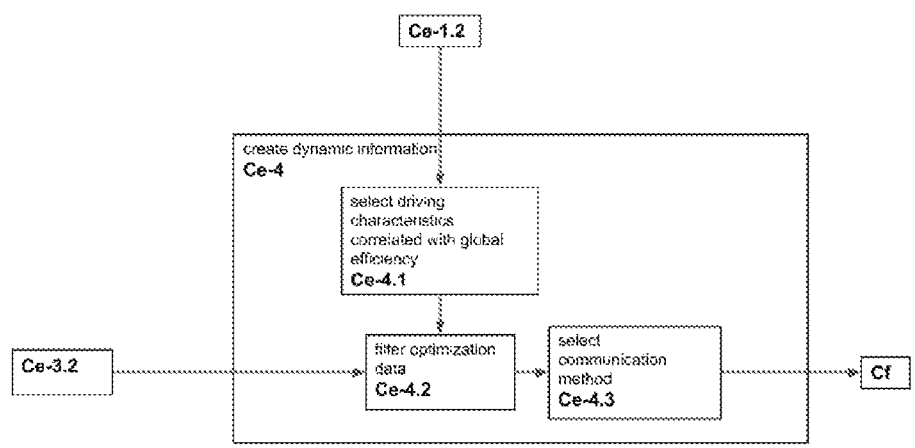
FIG. 7 is a detail of step Ce-4 of FIG. 3.

Therefore, with reference to FIG. 3, the remote information production step (Ce) comprises:

from the information received in step (Ca) (for example, vehicle velocity, number of revolutions per minute, among others):

correcting (Ce-1.1) vehicle model properties and states. By properties is meant attributes of the vehicle which characterize it, for example, weight, engine torque maps, among others. By states is meant degrees of freedom of the mathematical model, for example, longitudinal and lateral velocity, crankshaft velocity, among others. A computational model needs properties which characterize it according to the object to be modeled. For example, to model the way a vehicle moves, it becomes necessary to know its weight, since it's a determining force in the movement thereof. However, these properties vary over time, this variation having serious consequences in the overall vehicle modeling and efficiency. For example, considering a model of a vehicle with a mass of 1000 kg, instead of 2000 kg, will produce results that do not fit the reality of the 2000 kg. For this reason, it is necessary to frequently update the properties of the vehicle. For example, it will be expected that a vehicle sometimes runs empty and, at a later time, runs loaded. With respect to the vehicle model states, the computational solution of the vehicle model over time always considers a starting point, that is to say, what's the current states of the vehicle, so that it can be estimated what the states will be, for example, 10 seconds later. However, it is normal to have modeling errors, partly due to the numerical methods used and partly because it is an impractical task to perfectly model the physical world. The consequence of this fact is that errors are cumulative and, traditionally, model estimates over long periods of time produce results that are far from reality. In order to mitigate this problem, real-time correction of the states of the model is done with the aid of the information from (Ca). This correction is made, for example, through the so-called method Kalman Filter. Kalman filters, well known in the art, are applied in parallel to the optimization method in order to keep correcting the mathematical prediction with real data as it is applied;

from the stored information (Cd) in the database (for example, driver identifier):

identifying (Ce-1.2) the current driving profile. Through clustering techniques, namely through the method called K-MEANS, it is possible to distinguish the driving agents not knowing a priori the characterization of these profiles or even how many different profiles exist. This identification is accomplished simply by measuring the disparity (the term distance is used in the art) between the stored information and how it correlates, for example, to the fuel consumption. Such mathematical methods fall into the category of Unsupervised Learning and their advantages and disadvantages are well known in the art. Another example is the identification of the current profile of the driving agent against several previously identified driving profiles. These previously identified profiles can be defined, for example, empirically, and a model for detecting them can be constructed through the database included herein, through a method called Logistic Regression. This kind of mathematical methods falls within the category of Supervised Learning and its advantages and disadvantages are quite known in the art. The identification of the driving profile, in short, gives a greater real-time perception of the trait of the driving agent, which allows acting effectively in order to solve the performance fragilities thereof. These methods can identify, for example, which particular driving agent is strongly identified with profile A and weakly with profile B, where profile A is related to the pressing of the accelerator pedal and profile B is related to the pressing of the brake pedal. This result can serve as a filter to generate more targeted and effective suggestions in order to increase the overall efficiency of the vehicle, which is predominantly affected by the driving profile of the driving agent. In fact, there is no prior art which identifies driving profiles and integrates them into an optimization process in order to increase the overall efficiency of the vehicle;

from information collected in step (Cb) (such as, for example, traffic, routes, weather conditions, among others):

selecting (Ce-2.1.1) the path to be traveled and altimetry of such path. This information is introduced as a mathematical constraint, that is to say, a function that relates distance to height. Altimetry is of great importance in the overall efficiency of the vehicle because when the vehicle is descending, the engine is subject to a load quite below to the one seen when the vehicle is ascending. Knowing altimetry, optimization may determine, for example, which is the optimum throttle position to increase the overall efficiency of the vehicle, selecting (Ce-2.1.2) speed limit. This information is introduced as a mathematical constraint, that is to say, a maximum velocity value for the locations of the path, optionally (FIG. 4), selecting (Ce-2.1.3) other constraints. A preferred embodiment of (Ce-2,1,3), illustrated in FIG. 5, comprises:

selecting (Ce-2.1.3.1) path turns. This information is introduced as a mathematical constraint, that is to say, a function that relates distance with radius of curvature. Knowing the radii of curvature, it is possible to impose limits on the maximum cornering speeds for which the vehicle behaves in a safe manner, selecting (Ce-2.1.3.2) longitudinal and lateral acceleration limits for safety purposes. This information is introduced as a mathematical constraint, selecting (Ce-2.1.3.3) longitudinal and lateral acceleration limits for performance purposes. This information is introduced as a mathematical constraint, selecting (Ce-2.1.3.4) weather conditions. With this information it is possible to predict delays or traffic possibilities. This information is introduced as a mathematical constraint, selecting (Ce-2.1.3.5) traffic conditions. With this information it is possible to reduce the time in "stop-and-go", which is detrimental to the overall efficiency of the vehicle. This information is introduced as a mathematical constraint;

from the information collected in step (Cc):

selecting (Ce-2.2.1) time of arrival at the destination. This information is introduced as a mathematical constraint, that is to say, a date and time for a particular vehicle to be at destination point B. This information, together with the path information selected in (Ce-2.1.1), makes it possible to set the departure time or even if the vehicle may sacrifice travelling time at the expense of a lower speed, which is very advantageous on fuel savings. What is currently verified are vehicles that move frequently at the legal speed limit and, once at the destination, have to wait indeterminately for an external event that is not synchronized with the path time. Thus, the system and process of the invention allow optimizing the movement of the vehicle taking into account logistical factors which, as has been shown, have a relevant impact on the overall efficiency of the vehicle;

optionally (FIG. 4), defining (Ce-2.2.2) other constraints. A preferred embodiment for implementing this step, illustrated in FIG. 6, comprises:

selecting (Ce-2.2.2.1) speed limits due to transport of special load. This constraint may introduce more specific speed limits, selecting (Ce-2.2.2.2) longitudinal and lateral acceleration limits due to special load transport. This constraint may introduce more specific limits of longitudinal and lateral acceleration, selecting (Ce-2.2.2.3) required places of passage. This constraint may delay the time of arrival at the destination;

returning to FIG. 3 and in the sequence of the previous steps:

upgrading (Ce-3.1) vehicle's mathematical model. The mathematical model is composed of differential equations, with at least 2 degrees of freedom (longitudinal velocity of the vehicle and crankshaft velocity). This model can also include actuators deemed necessary, for example, accelerator pedals, brake, clutch, retarders, engine brake, gearbox, among others. This model has properties and defined states: properties comprise, for example, the engine torque map, vehicle weight, among others; the motor states correspond to each degree of freedom where, in the present example, the longitudinal velocity of the vehicle and crankshaft velocity are mentioned. This model is capable of computationally estimating the behavior of a real vehicle, whereby it is important to update the properties and states of the model by using real values before optimization, in order to obtain equally real results. This update is very relevant to accurately designing the overall efficiency of the vehicle;

calculating (Ce-3.2) optimization of the vehicle's mathematical model. What is intended is to maximize or minimize a cost function. Thus, an optimization is calculated with a method such as, for example, the Predictive Control Model (which focuses on the updated model (Ce-3.1)) that is constrained by (Ce-2.1.1, Ce-2.1.2, Ce-2.2.1), and optionally by (Ce-2.1.3, Ce-2.2.2), and has a cost function which is to be maximized, in this case the overall efficiency of the vehicle. This results in a driving technique that satisfies those same constraints, that is to say, it results a set of vectors with time dimension that describe the evolution of the velocity, the accelerator pedal, the brake pedal, the crankshaft velocity, among others, along the path. Optimizing the movement of a vehicle to, for example, minimize fuel consumption, means elaborating a mathematical function representative of fuel consumption, and finding its mathematical minimum. For such, there are several mathematical methods available in the art, namely Newton's Method or Predictive Control Model. Such optimizations may consider constraints, that is to say, solutions that would be mathematically possible but which, for the purposes of the relevant problem, are not acceptable, for example, the maximum speed to correspond to the legally permissible maximum limit in detriment of the maximum limit allowed by the vehicle's engine;

constructing (Ce-4) remote information, comprising (see FIG. 7):

selecting (Ce-4.1) driving characteristics correlated with the overall efficiency. The profile identified in (Ce-1.2) distinguishes the most varied characteristics, for example, if a given driving agent is braking too much or too little, if it is accelerating too much or too little, if it undertakes sudden movements or not, and even multiple combinations among these, which form new characteristics, which do not have to be formally defined a priori. All these characteristics are correlated to a greater or lesser extent with, for example, fuel consumption. As an example, it is selected (Ce-4.1) the characteristic that is having, at that moment, a greater impact on fuel consumption. This selection, in real time, is a relevant step in increasing the overall efficiency of a vehicle. It is known, first of all, that a driving agent has different reactions to different stretches of a path; secondly, that different driving agents have different reactions to the same stretch; thirdly, that different vehicles perform differently depending on the stretch and depending on the driver. Thus, step (Ce-4.1) finds the characteristic that has the greatest impact on overall efficiency of the vehicle, taking into account all the above factors and effectively reducing the impact that such factor variability has on overall efficiency of the vehicle, filtering (Ce-4.2) information coming from optimization (Ce-3.2), with at least one of the characteristics selected in (Ce-4.1), to obtain a smaller data set, aiming to mitigate, for example, the characteristic that is affecting the overall efficiency of the vehicle the most. As an example, consider the optimization (Ce-3.2) result along a path, of the position of the accelerator pedal and the brake pedal; of the derivative of the position of the accelerator pedal and the brake pedal; of the speed; of the positive acceleration; of the negative acceleration; knowing that the characteristic of the profile identified in (Ce-4.1) of greater correlation with the overall efficiency of the vehicle is the position of the accelerator pedal, one discards all of the information coming from the optimization except the one relating to the accelerator pedal. Thus, the instruction or alert to be passed to the driving agent focuses on the characteristic that has the most impact on the overall efficiency of the vehicle. This continuous research and attention to the characteristic that affects the performance the most has not been solved by the prior art and has been, up to the present invention, a true problem in human driving agents, which is referred to in performance evaluations of the driving agents but had not until now been the subject of a technical resolution in the sense for example, of knowing at what particular moment the performance deteriorates, in order to provide to the driver real time corrective or preventive information so as to achieve optimum performance, selecting (Ce-4.3) method of communication. The remote information is communicated as auditory and/or visual, if it is a human driving agent and programmatically, if it is a machine driving agent. It makes more sense, for example, to alert the human driving agent which part of a particular path where overall efficiency is worse on top of a topographic map, the method thus being visual. On the other hand, it makes more sense to alert a machine driving agent in a programmatically way.

In an example, the process of the invention is applied to a vehicle driven by a human driving agent. Information relating to vehicle speed and engine revolutions per minute is collected through a redirection device (2). This information is sent first to the dedicated application of a tablet (3) and then to a remote server (4). Already on the remote server (4), information about the path and its altimetry is collected from external data providers and, by way of mathematical optimization, the optimum position of the accelerator pedal is calculated along such path. By identifying the driver's profile as particularly ineffective in ascents, this information is sent back to the dedicated application and the driving agent is auditively instructed to, at the start of the next ascent, which is 500 meters away, to drive the vehicle in such a way that it ideally enters with a speed of 60 km/h and with an accelerator pedal position set at 40% of its travel. A prior art solution would classify a driving agent about the momentary use of the accelerator pedal's position. In a certain future scenario, it would not inform the correct position of the accelerator pedal in advance, which would allow the driving agent to adjust to this information.

In another example applied to a vehicle driven by a human driving agent, the device (2) collects information relating to the speed of the vehicle and position of the brake pedal. This information is first sent to the dedicated application installed on a portable computer (3) and then to the remote server (4). Already on the remote server (4), information about the path and its altimetry is collected from external data providers and, by way of mathematical optimization, the optimum position of the brake pedal is calculated along such path. By identifying the driver's profile as particularly ineffective when braking, this information is sent back to the dedicated application and the driving agent instructed to, because there's a roundabout 500 m from that point, slightly start braking from that moment, following a gauge-style graphic that is displayed on the laptop computer display (3). In addition, it is visually alerted whenever the brake pedal is abruptly driven. There is no prior art solution which devises an approach plan to obstacles and communicates it in advance to the driver in order to increase the overall efficiency of the vehicle.

In another example, applied to a vehicle driven by a human driving agent, the device (2) collects information relating to the speed of the vehicle and revolutions per minute of the engine. This information is sent first to the application installed on a smartphone (3) and then to the remote server (4). Already on the remote server (4), information about the path, namely the curvature of the path, is collected from external date providers and, through optimization, the speed of the vehicle is estimated at the next turn. By identifying the driver profile as particularly unsafe when performing turns, this information is sent back to the dedicated application and the driving agent is visually alerted that the current speed is excessive and dangerous to perform the turn which is 500 meters away. A prior art solution would alert a driving agent to speeding and even to different speed limits based on the geographic position. It would not inform in advance that the current speed will be excessive to accomplish a certain turn, which has a certain radius of curvature and generates lateral accelerations that put the vehicle in danger. It would also not inform that the current velocity, although hypothetically legal, would not be the most efficient to undertake a certain path in a certain time period.

In yet another example applied to a vehicle driven by a machine driving agent, the device (2) collects information relating to the speed of the vehicle and the number of revolutions per minute of the engine. This information is first sent to the dedicated application installed in an onboard processing device (3) of the vehicle and then to the remote server (4). Already on the remote server (4), information about the path and its altimetry is collected from external data providers and, by way of mathematical optimization, the optimum speed profile is calculated along this path. Having classified the vehicle's controller program as particularly inefficient at carrying out ascents, this information is sent back to the dedicated application and the on-board computer is instructed to enter the next ascend with a speed of 60 km/h. Based on the geographic position, a prior art solution would alert a driving agent to speeding and even to different speed limits. It would not inform in advance what would be the most efficient speed for a particular vehicle, with a known weight, to climb a hill.

The advantages of the method and system of the present invention over previously identified prior art solutions are not only the contextualization driving agent/vehicle/environment, which in itself has a very significant impact as mentioned above, but also the anticipation of the most varied future events and the dramatic impact they have on the overall efficiency of the vehicle which, for a variety of reasons, are ignored not only by the solutions of the prior art, but also by the driving agent. Another advantage is that the invention is able to significantly reduce the impact that a driving agent has on driving a vehicle and thus eliminate the variability factor of driving methods of a group of driving agents, which provides overall efficiency results optimized for a vehicle irrespective of its driving agent.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the scope of the invention.

What is claimed is:

1. A computer implemented method for providing in advance information on driving actions to a driving agent of a vehicle., comprising steps of:
    receiving vehicle technical data (VTD) from a VTD processor at a processing device;
    generating local information at the processing device from the received VTD and processing device information generated by the processing device;
    creating remote information at a remote server from the processing device information, external data provider information coming from one or more external data providers and client logistic information, said remote information is personalized to the driving agent through computing optimization of movement of the vehicle using one or more constraints generated from the processing device information,the external data provider information and the client logistic information and an optimization result is cross-checked with a current driving profile;
    storing the processing device information, the external data provider information and the client logistic information in a database; and
    presenting the remote information and optionally the local information to the driving agent in advance of the driving action using the processing device.

2. The method of claim 1 wherein the VTD is redirected at predefined time intervals to the processing device.

3. The method of claim 1 wherein the external data provider information includes one or more of data relating to altimetry of a path to be traveled, traffic data, route data or weather conditions.

4. The method of claim 1 further comprising steps of:
    correcting in received processing device information one or more vehicle model properties and one or more states to provide corrected processing device information; and
    upgrading a model of the vehicle with the corrected processing device information before computing optimization of movement of the vehicle.

5. The method of claim 1 further comprising a step of:
    identifying the current driving profile from one or more of the processing device information, the external data provider information and client information stored in the database.

6. The method of claim 4 wherein computing optimization of movement of the vehicle further comprises steps of:
    selecting a path to be traveled from one of the constraints of the external data provider information;
    selecting an altimetry of the path; and
    selecting a speed limit for locations of the path from one of the constraints of the external data provider information.

7. The method of claim 4 wherein computing optimization of movement of the vehicle further comprises one or more of steps of:
    selecting path turns of a path to be traveled from one of the constraints of the external data provider information;
    selecting longitudinal and lateral acceleration limits for safety purposes from one of the constraints of the external data provider information;
    selecting longitudinal and lateral acceleration limits for performance purposes from one of the constraints of the external data provider information;
    selecting a weather condition from one of the constraints of the external data provider information; and
    selecting a traffic condition from one of the constraints of the external data provider information.

8. The method of claim 4 wherein computing optimization of movement of the vehicle further comprises one or more of steps of:
    selecting a time of arrival at a destination from one of the constraints of client information;
    selecting a speed limit for transport of a special load from one of the constraints of client information;
    selecting longitudinal and latitudinal acceleration limits for transport of a special load from one of the constraints of client information; and
    selecting mandatory waypoints from one of the constraints of client information.

9. The method of claim 5 further comprising steps of:
    selecting one or more driving characteristics correlated with an overall efficiency from the current driver profile;
    filtering information coming from the computing optimization of movement of the vehicle with the one or more selected driving characteristics to obtain the remote information; and
    selecting a mode of communication for presenting the remote information at the processing device, wherein the mode of communication is auditory and/or visual if the driving agent is a human driving agent or the mode of communication is programmatically if the driving agent is a machine driving agent.

10. A non-transitory computer readable medium including software instructions which when executed by a processor performs a method comprising:
    receiving vehicle technical data (VTD) from a VTD processor at a processing device;
    generating local information at the processing device from the received VTD and processing device information generated by the processing device;
    creating remote information at a remote server from the processing device information, external data provider information coming from one or more external data providers and client logistic information;
    computing optimization of movement of the vehicle using one or more constraints generated from the information from the processing device information, the external data provider information and the client logistic information and an optimization result is cross-checked with a current driving profile; and
    presenting the remote information and optionally the local information to a driving agent in advance of the driving action using the processing device.

11. The non-transitory computer readable medium of claim 10 wherein VTD from the VTD processor is received at the said processing device at predefined time intervals.

12. The non-transitory computer readable medium of claim 10 further comprising:
   correcting in received processing device information one or more vehicle model properties and one or more states to provide corrected processing device information; and
   upgrading a model of the vehicle with the corrected processing device information before computing optimization of movement of the vehicle.

13. The non-transitory computer readable medium of claim 12 further comprising:
   selecting a path to be traveled from one of the constraints of the external data provider information;
   selecting an altimetry of the path; and
   selecting a speed limit for locations of the path from one of the constraints of the external data provider information.

14. The non-transitory computer readable medium of claim 12 wherein computing optimization of movement of the vehicle comprises:
   selecting path turns of a path to be traveled from one of the constraints of the external data provider information;
   selecting longitudinal and lateral acceleration limits for safety purposes from one of the constraints of the external data provider information;
   selecting longitudinal and lateral acceleration limits for performance purposes from one of the constraints of the external data provider information;
   selecting a weather condition from one of the constraints of the external data provider information; and
   selecting a traffic condition from one of the constraints of the external data provider information.

15. The non-transitory computer readable medium of claim 12 wherein computing optimization of movement of the vehicle further comprises:
   selecting a time of arrival at a destination from one of the constraints of client information;
   selecting a speed limit for transport of a special load from one of the constraints of client information;
   selecting longitudinal and latitudinal acceleration limits for transport of a special load from one of the constraints of client information; and
   selecting mandatory waypoints from one of the constraints of client information.

16. The non-transitory computer readable medium of claim 12 wherein computing optimization of movement of the vehicle further comprises:
   identifying the current driving profile from one or more of the processing device information, the external data provider information and the client information stored in a database;
   selecting one or more driving characteristics correlated with an overall efficiency from a current driver profile;
   filtering information coming from the computing optimization of movement of the vehicle with the one or more selected driving characteristics to obtain the remote information; and
   selecting a mode of communication for presenting the remote information at the processing device, wherein the mode of communication is auditory and/or visual if the driving agent is a human driving agent or the mode of communication is programmatically if the driving agent is a machine driving agent.

17. A system for providing in advance information on driving actions to a driving agent of a vehicle, the system comprising:
   one or more processing devices for receiving vehicle technical data (VTD) from a VTD processor and generating local information at the processing device from the received VTD and processing device information generated by the one or more processing devices;
   a remote server creating remote information from the processing device information, external data provider information coming from one or more external data providers and client logistic information, said remote information is personalized to the driving agent through computing optimization of movement of the vehicle using one or more constraints generated from the processing device information, the external data provider information and the client logistic information and an optimization result is cross-checked with a current driving profile; and
   a database for storing the processing device information, the external data provider information and the client logistic information,
   wherein the one or more processing devices present the remote information and optionally the local information to the driving agent in advance of the driving action.

18. The system of claim 17 further comprising a redirection device for redirecting the VTD from a CAN to the one or more processing devices at predefined time intervals.

* * * * *